US012438315B2

(12) United States Patent
Liu et al.

(10) Patent No.: US 12,438,315 B2
(45) Date of Patent: Oct. 7, 2025

(54) ELECTRICAL CONNECTOR WITH IMPROVED TERMINAL GROUPS AND CONNECTOR ASSEMBLY HAVING THE SAME

(71) Applicant: SPEED TECH CORPORATION, Taoyuan (TW)

(72) Inventors: Chung-Peng Liu, Taoyuan (TW); Wen-fu Pon, Taoyuan (TW); Hui-Hsueh Chiang, Taoyuan (TW)

(73) Assignee: SPEED TECH CORPORATION, Taoyuan Hsien (TW)

( * ) Notice: Subject to any disclaimer, the term of this patent is extended or adjusted under 35 U.S.C. 154(b) by 387 days.

(21) Appl. No.: 18/113,906

(22) Filed: Feb. 24, 2023

(65) Prior Publication Data

US 2024/0072500 A1 Feb. 29, 2024

(30) Foreign Application Priority Data

Aug. 25, 2022 (CN) ......................... 202211025221.5

(51) Int. Cl.

| | |
|---|---|
| ***H01R 24/60*** | (2011.01) |
| ***H01R 12/72*** | (2011.01) |
| ***H01R 13/50*** | (2006.01) |
| ***H01R 13/514*** | (2006.01) |

(52) U.S. Cl.

CPC ........... *H01R 24/60* (2013.01); *H01R 12/724* (2013.01); *H01R 13/50* (2013.01); *H01R 13/514* (2013.01)

(58) Field of Classification Search

None

See application file for complete search history.

(56) References Cited

U.S. PATENT DOCUMENTS

| | | | | |
|---|---|---|---|---|
| 9,806,468 | B2 * | 10/2017 | Liao | H01R 4/023 |
| 10,069,262 | B2 * | 9/2018 | Little | H01R 27/00 |
| 10,128,585 | B1 | 11/2018 | Xu et al. | |
| 10,367,308 | B2 | 7/2019 | Little et al. | |
| 12,237,601 | B2 * | 2/2025 | Fu | H01R 12/724 |

(Continued)

FOREIGN PATENT DOCUMENTS

| | | |
|---|---|---|
| CN | 101609940 A | 12/2009 |
| CN | 105449401 A | 3/2016 |

(Continued)

OTHER PUBLICATIONS

Office Action for TW 111132126 dated Feb. 15, 2023.

*Primary Examiner* — Oscar C Jimenez

(74) *Attorney, Agent, or Firm* — Birch, Stewart, Kolasch & Birch, LLP

(57) ABSTRACT

An electrical connector includes an insulating body and a number of terminal groups. The insulating body includes a mating slot, a first notch and a second notch. The first notch and the second notch are symmetrically arranged on opposite sides of the mating slot. The terminal groups include a first conductive terminal, a second conductive terminal, a third conductive terminal and a fourth conductive terminal. Each conductive terminals includes a mating portion extending into the mating slot. With this arrangement, relatively more terminal groups can be provided, which is beneficial to improve the speed of data transmission. A connector assembly having the electrical connector is also disclosed.

20 Claims, 13 Drawing Sheets

(56) References Cited

U.S. PATENT DOCUMENTS

| | | | | |
|---|---|---|---|---|
| 2012/0322313 | A1 * | 12/2012 | Hsu | H01R 12/724 439/676 |
| 2019/0020152 | A1 * | 1/2019 | Little | H01R 13/6587 |
| 2019/0036263 | A1 * | 1/2019 | Avery | H01R 13/405 |
| 2019/0116692 | A1 * | 4/2019 | Little | H05K 7/20336 |

FOREIGN PATENT DOCUMENTS

| | | | |
|---|---|---|---|
| CN | 109462090 | A | 3/2019 |
| CN | 211428391 | U | 9/2020 |
| CN | 215184610 | U | 12/2021 |
| CN | 113964567 | A | 1/2022 |
| TW | M499691 | U | 4/2015 |
| TW | 202013823 | A | 4/2020 |
| TW | 202130051 | A | 8/2021 |
| TW | 202130052 | A | 8/2021 |

* cited by examiner

ELECTRICAL CONNECTOR WITH IMPROVED TERMINAL GROUPS AND CONNECTOR ASSEMBLY HAVING THE SAME

CROSS-REFERENCE TO RELATED APPLICATION

This patent application claims priority of a Chinese Patent Application No. 202211025221.5, filed on Aug. 25, 2022 and titled "ELECTRICAL CONNECTOR AND CONNECTOR ASSEMBLY HAVING THE SAME", the entire content of which is incorporated herein by reference.

TECHNICAL FIELD

The present disclosure relates to an electrical connector and a connector assembly, which belongs to a technical field of connectors.

BACKGROUND

A connector assembly in the related art typically includes a plug connector and a receptacle connector which mate with each other. The receptacle connector includes an insulating body and a plurality of receptacle conductive terminals. The plug connector includes a tongue plate and a plurality of metal pads provided on the tongue plate.

With the increasing requirements of various electronic devices on connector components, how to improve the efficiency of data transmission is a technical problem that needs to be solved by those skilled in the art.

SUMMARY

An object of the present disclosure is to provide an electrical connector and a connector assembly capable of improving data transmission.

In order to achieve the above object, the present disclosure adopts the following technical solution: an electrical connector, including: an insulating body including a mating surface, a mating slot extending through the mating surface along a first direction, a first notch and a second notch, the first notch and the second notch extending through the mating surface along the first direction and being located on opposite sides of the mating slot, respectively; the first notch and the second notch communicating with the mating slot, the first notch and the second notch being symmetrically formed on the opposites sides of the mating slot along a second direction, the second direction being perpendicular to the first direction; and a plurality of terminal groups including a first terminal group and a second terminal group, the first terminal group including a first conductive terminal and a second conductive terminal, the second terminal group including a third conductive terminal and a fourth conductive terminal, the first conductive terminal including a first elastic arm, the first elastic arm including a first mating portion at least partially protruding into the mating slot; the second conductive terminal including a second elastic arm, the second elastic arm including a second mating portion at least partially protruding into the mating slot; the third conductive terminal including a third elastic arm, the third elastic arm including a third mating portion at least partially protruding into the mating slot; the fourth conductive terminal including a fourth elastic arm, the fourth elastic arm including a fourth mating portion at least partially protruding into the mating slot; the first mating portion and the second mating portion being disposed facing each other, the third mating portion and the fourth mating portion being disposed facing each other.

In order to achieve the above object, the present disclosure adopts the following technical solution: a connector assembly, including: an electrical connector including: an insulating body including a mating surface, a mating slot extending through the mating surface along a first direction, a first notch and a second notch, the first notch and the second notch extending through the mating surface along the first direction and being located on opposite sides of the mating slot, respectively; the first notch and the second notch communicating with the mating slot, the first notch and the second notch being symmetrically formed on the opposites sides of the mating slot along a second direction, the second direction being perpendicular to the first direction; and a plurality of terminal groups including a first terminal group and a second terminal group, the first terminal group including a first conductive terminal and a second conductive terminal, the second terminal group including a third conductive terminal and a fourth conductive terminal, the first conductive terminal including a first elastic arm, the first elastic arm including a first mating portion at least partially protruding into the mating slot; the second conductive terminal including a second elastic arm, the second elastic arm including a second mating portion at least partially protruding into the mating slot; the third conductive terminal including a third elastic arm, the third elastic arm including a third mating portion at least partially protruding into the mating slot; the fourth conductive terminal including a fourth elastic arm, the fourth elastic arm including a fourth mating portion at least partially protruding into the mating slot; the first mating portion and the second mating portion being disposed facing each other, the third mating portion and the fourth mating portion being disposed facing each other; and a mating connector including: a tongue plate including a first plate portion and a second plate portion, the first plate portion and the second plate portion being arranged along the first direction, a thickness of the first plate portion being greater than a thickness of the second plate portion, a first metal pad and a second metal pad being provided on opposite surfaces of the first plate portion, respectively; a third metal pad and a fourth metal pad being provided on opposite surfaces of the second plate portion, respectively; when the mating connector is mated with the electrical connector, the tongue plate is inserted into the mating slot, the first metal pad is in contact with the first mating portion, the second metal pad is in contact with the second mating portion, the third metal pad is in contact with the third mating portion, and the fourth metal pad is in contact with the fourth mating portion.

The present disclosure provides a first terminal group and a second terminal group. The first terminal group includes a first conductive terminal and a second conductive terminal. The second terminal group includes a third conductive terminal and a fourth conductive terminal. The first conductive terminal includes a first elastic arm. The first elastic arm includes a first mating portion at least partially protruding into the mating slot. The second conductive terminal includes a second elastic arm. The second elastic arm includes a second mating portion at least partially protruding into the mating slot. The third conductive terminal includes a third elastic arm. The third elastic arm includes a third mating portion at least partially protruding into the mating slot. The fourth conductive terminal includes a fourth elastic arm. The fourth elastic arm includes a fourth mating portion at least partially protruding into the mating slot. The first mating portion and the second mating portion are arranged to face each other. The third mating portion and the fourth mating portion are arranged to face each other. Compared with the prior art, the electrical connector of the present disclosure has relatively more terminal groups, which is beneficial to improve the speed of data transmission.

DETAILED DESCRIPTION

Figure 1:
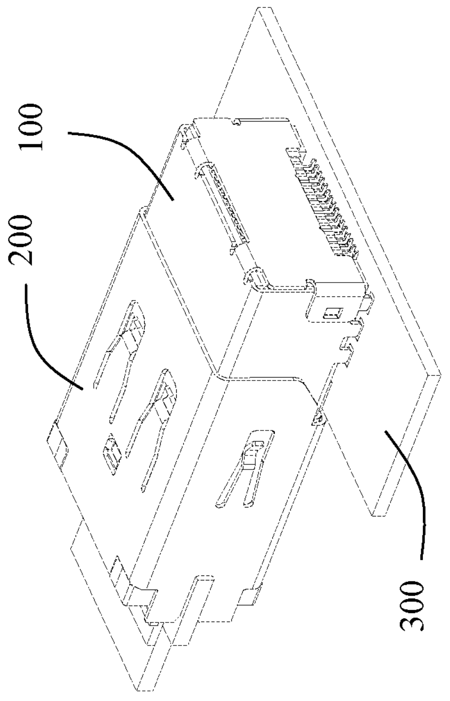
FIG. 1 is a schematic perspective view of a connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
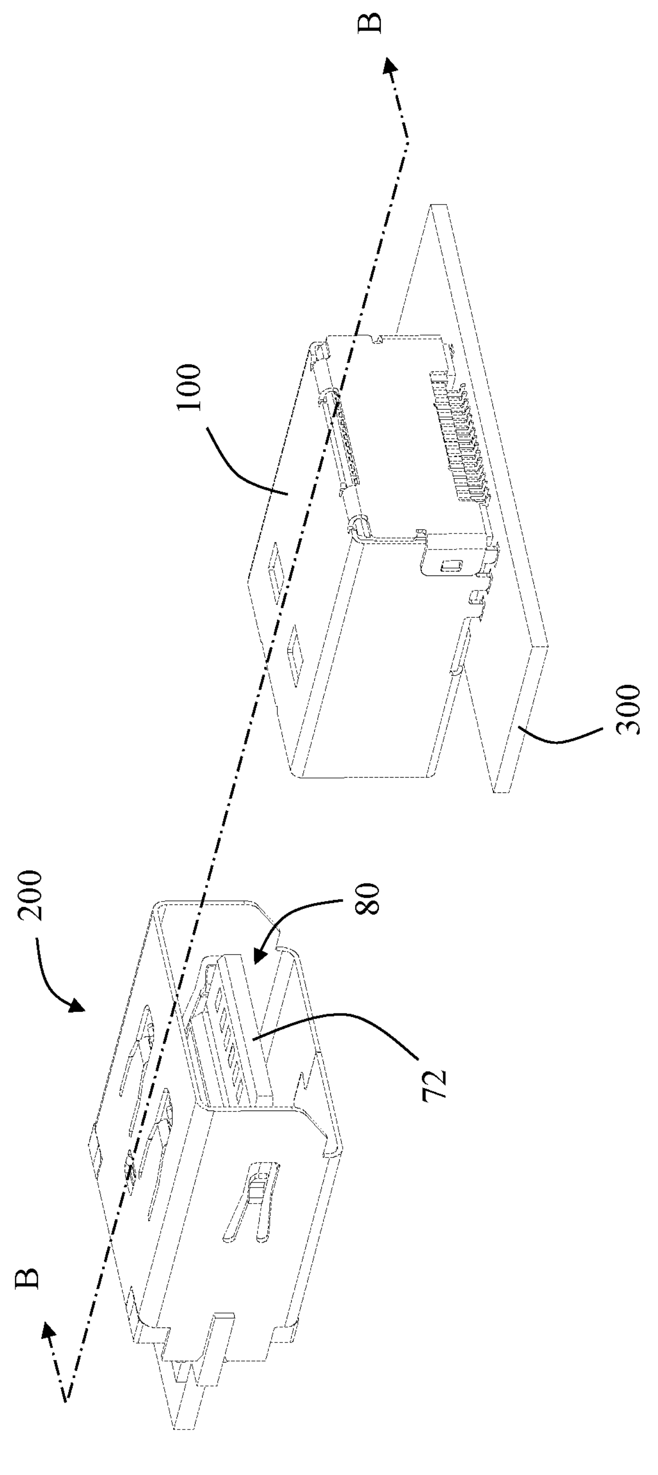
FIG. 2 is a partial perspective exploded view of FIG. 1.
Figure 3:
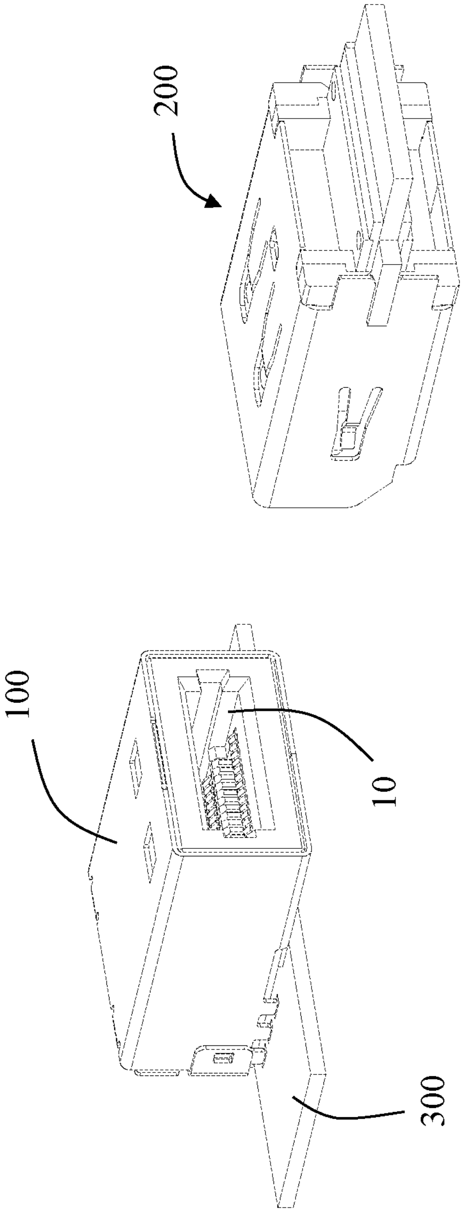
FIG. 3 is a partial perspective exploded view of FIG. 2 from another angle.

Referring to FIG. 1 to FIG. 3, an embodiment of the present disclosure discloses a connector assembly including a circuit board 300, an electrical connector 100 mounted on the circuit board 300, and a mating connector 200 for mating with the electrical connector 100.

Figure 4:
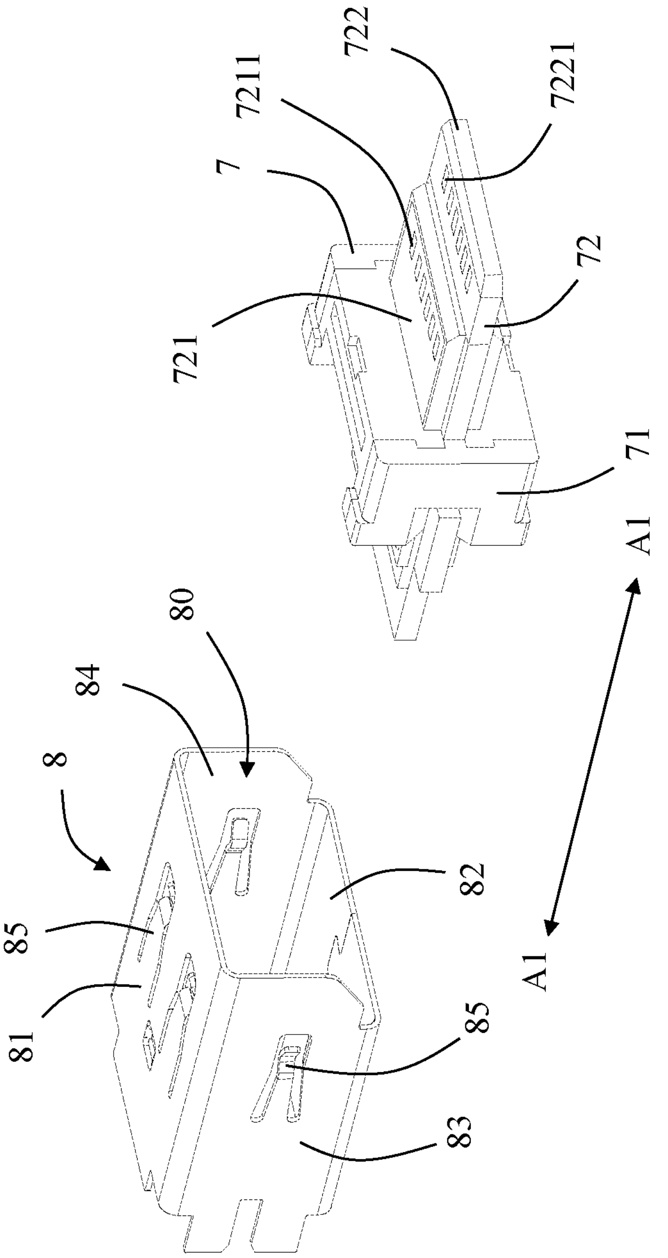
FIG. 4 is a partial perspective exploded view of a mating connector in accordance with an embodiment of the present disclosure.
Figure 5:
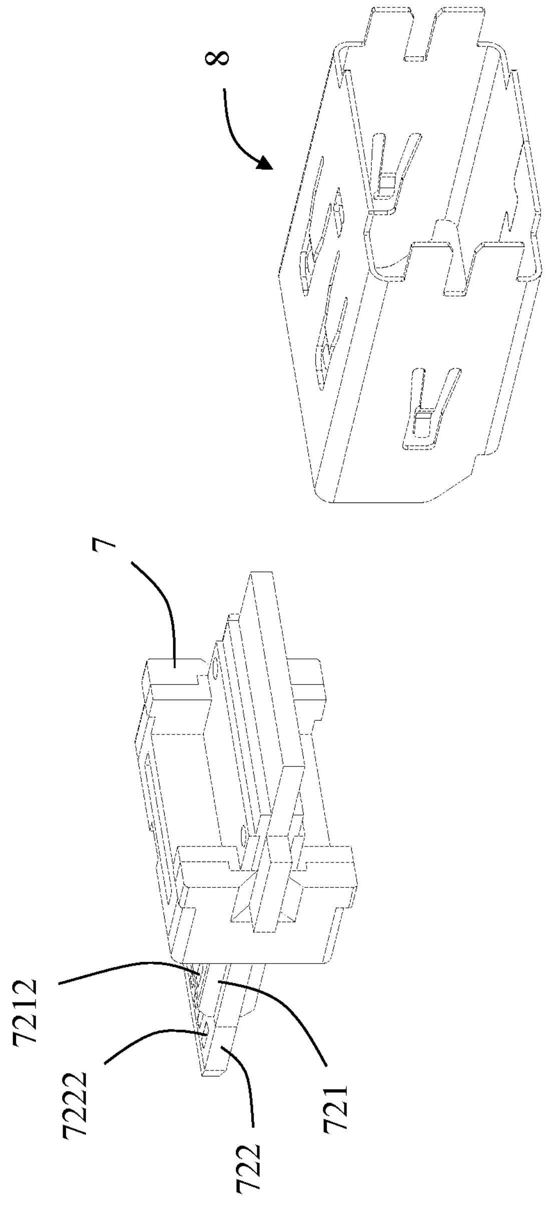
FIG. 5 is a partial perspective exploded view of FIG. 4 from another angle.
Figure 10:
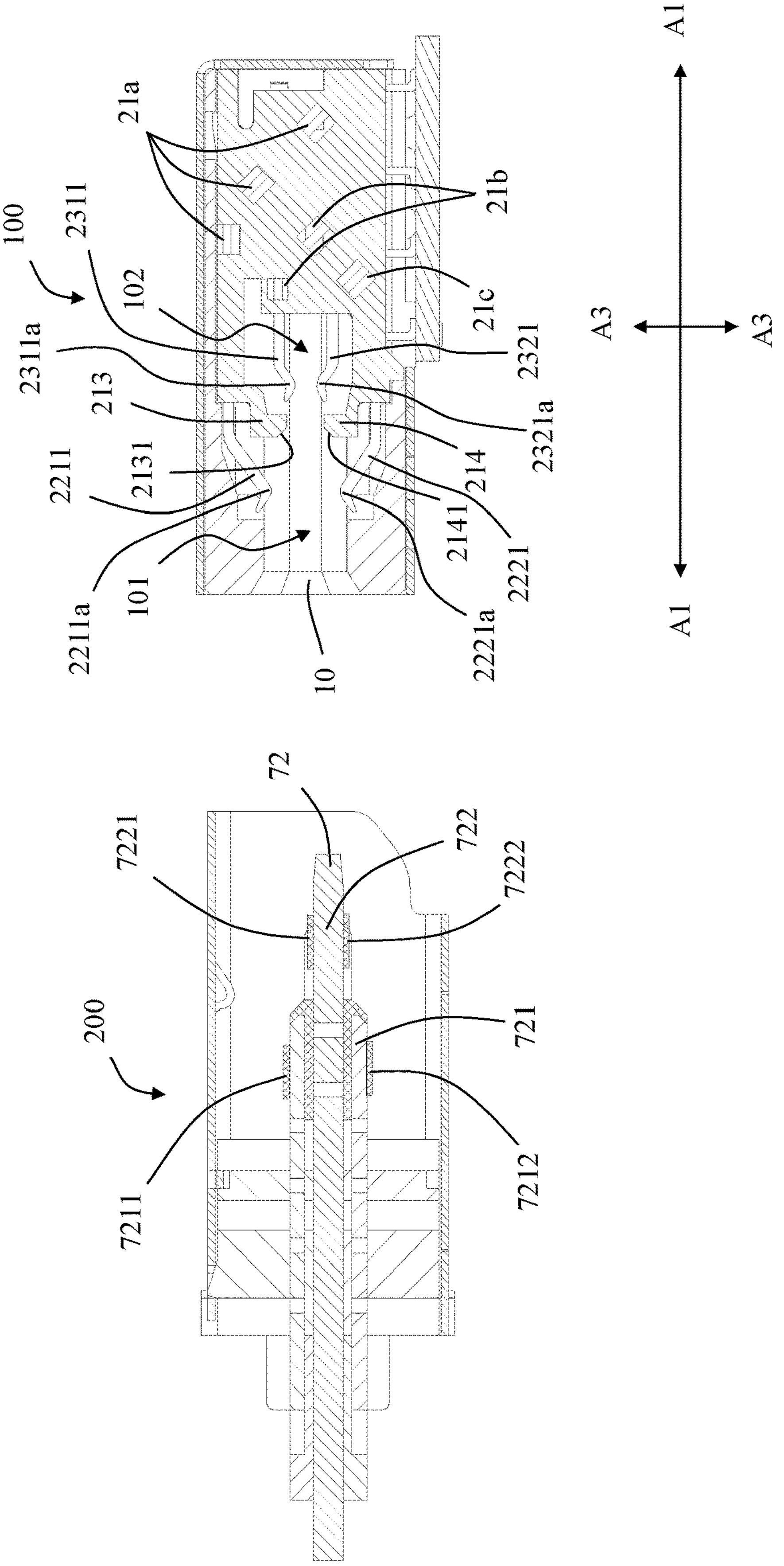
FIG. 10 is a schematic cross-sectional view taken along line B-B in FIG. 2.
Figure 11:
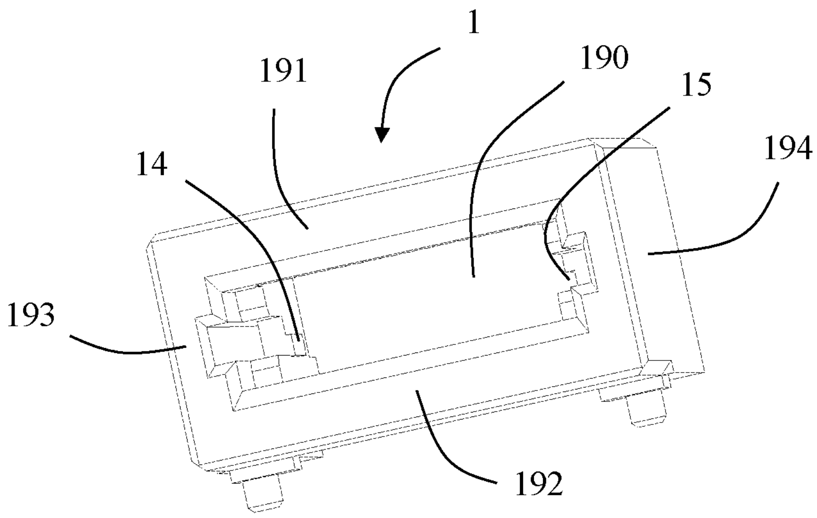
FIG. 11 is a schematic perspective view of an insulating body in accordance with an embodiment of the present disclosure.
Figure 12:
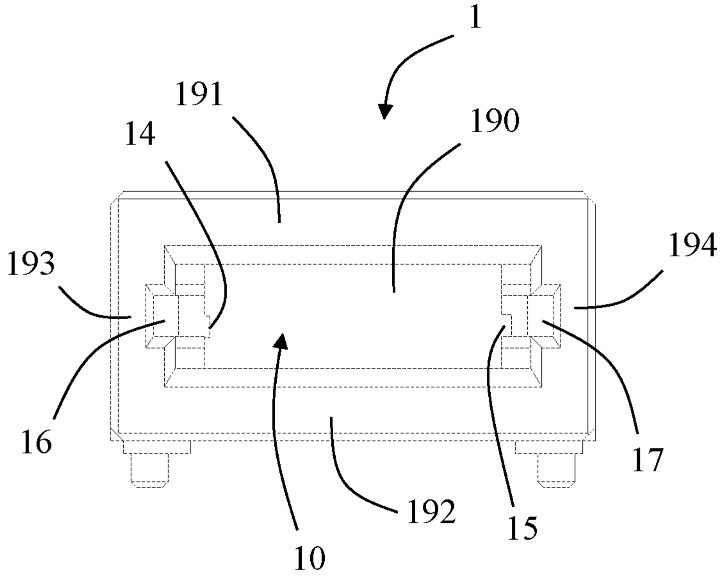
FIG. 12 is a front view of FIG. 11.
Figure 13:
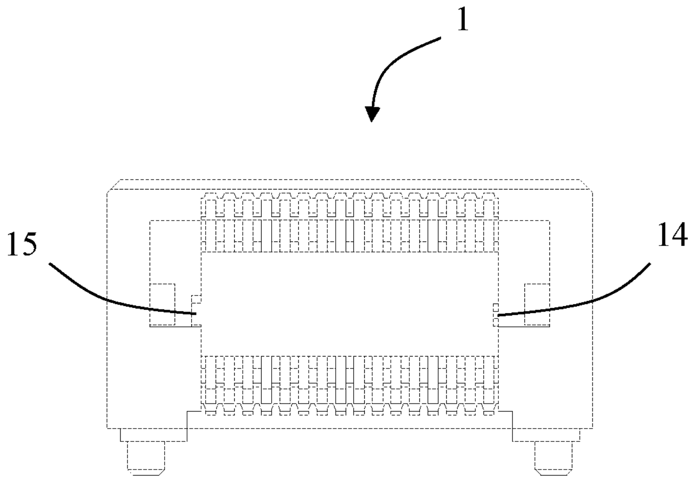
FIG. 13 is a rear view of FIG. 11.

Referring to FIG. 4, FIG. 5 and FIG. 10, the mating connector 200 includes a mating insulating body 7 and a mating shielding shell 8 enclosing the mating insulating body 7. The mating insulating body 7 includes a base portion 71 and a tongue plate 72 protruding beyond the base portion 71. The tongue plate 72 includes a first plate portion 721 and a second plate portion 722. The first plate portion 721 and the second plate portion 722 are arranged along a first direction A1-A1. A thickness of the first plate portion 721 is greater than a thickness of the second plate portion 722, so that the tongue plate 72 is generally of a stepped configuration. A plurality of first metal pads 7211 and a plurality of second metal pads 7212 are provided on opposite surfaces of the first plate portion 721, respectively. A plurality of third metal pads 7221 and a plurality of fourth metal pads 7222 are provided on opposite surfaces of the second plate portion 722, respectively. Preferably, the tongue plate 72 is formed by a plurality of built-in circuit boards combined with other injection molding processes.

The mating shielding shell 8 is fixed to the mating insulating body 7. The mating shielding shell 8 is sleeve-shaped, and includes a first wall portion 81, a second wall portion 82 opposite to the first wall portion 81, a first side wall 83 connecting one side of the first wall portion 81 and one side of the second wall portion 82, and a second side wall 84 connecting another side of the first wall portion 81 and another side of the second wall portion 82. The mating shielding shell 8 further includes a mating space 80 jointly enclosed by the first wall portion 81, the second wall portion 82, the first side wall 83 and the second side wall 84. The mating space 80 is configured to at least partially receive the electrical connector 100. The tongue plate 72 extends into the mating space 80. The tongue plate 72 is at least partially inserted into the electrical connector 100. At least one of the first wall portion 81, the second wall portion 82, the first side wall 83 and the second side wall 84 is provided with an elastic engaging arm 85 extending into the mating space 80. The elastic engaging arm 85 is configured for abutting against the electrical connector 100 to realize grounding and increase the insertion force.

Referring to FIGS. 6 to 10, in the embodiment shown in the present disclosure, the electrical connector 100 includes an insulating body 1, a plurality of terminal modules 2, a shielding shell 3, and a stopper (not shown) assembled at a rear end of the plurality of terminal modules 2. The stopper is fixed to the insulating body 1.

Figure 6:
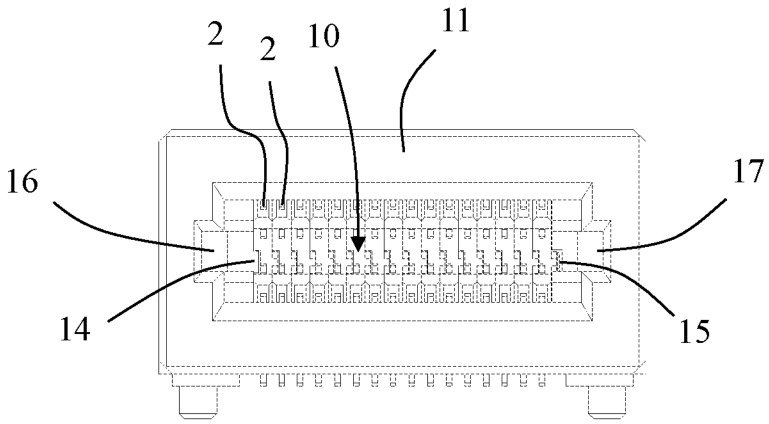
FIG. 6 is a front view of the electrical connector of the present disclosure after removing a shielding shell.
Figure 7:
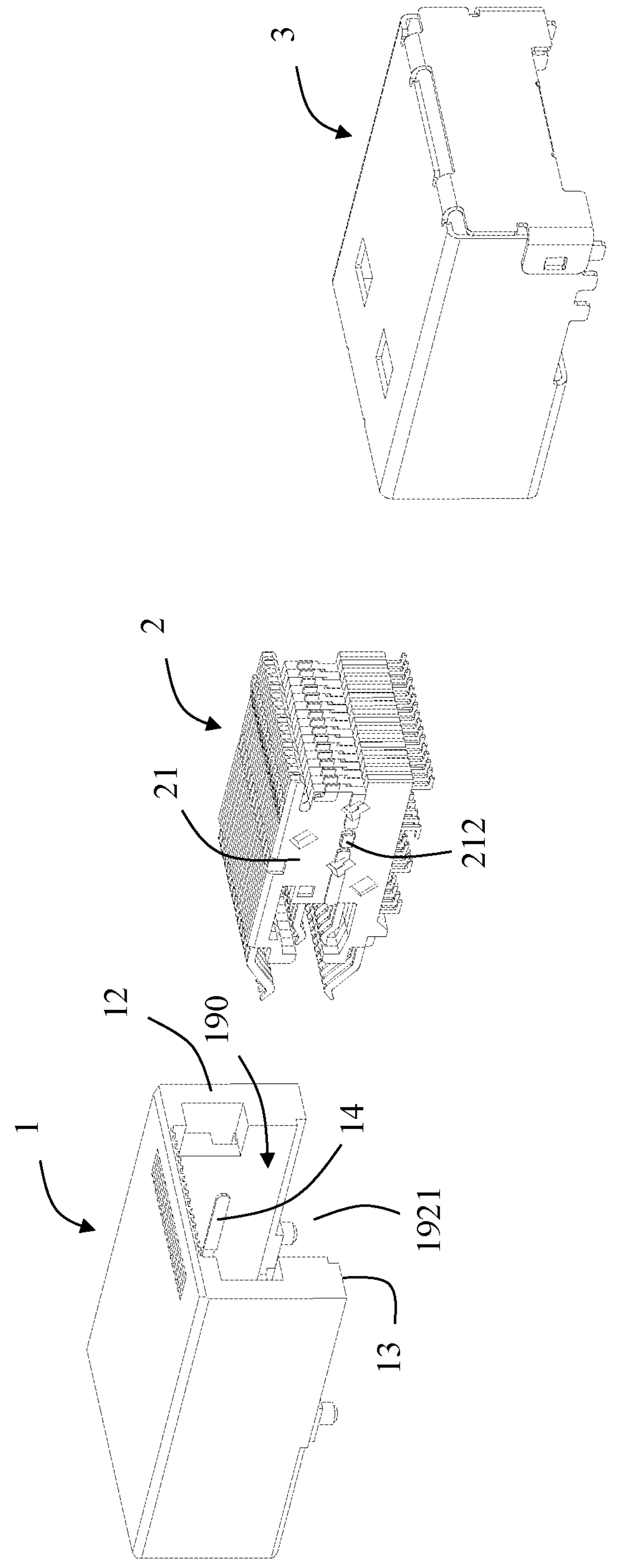
FIG. 7 is a partial perspective exploded view of the electrical connector of the present disclosure.
Figure 8:
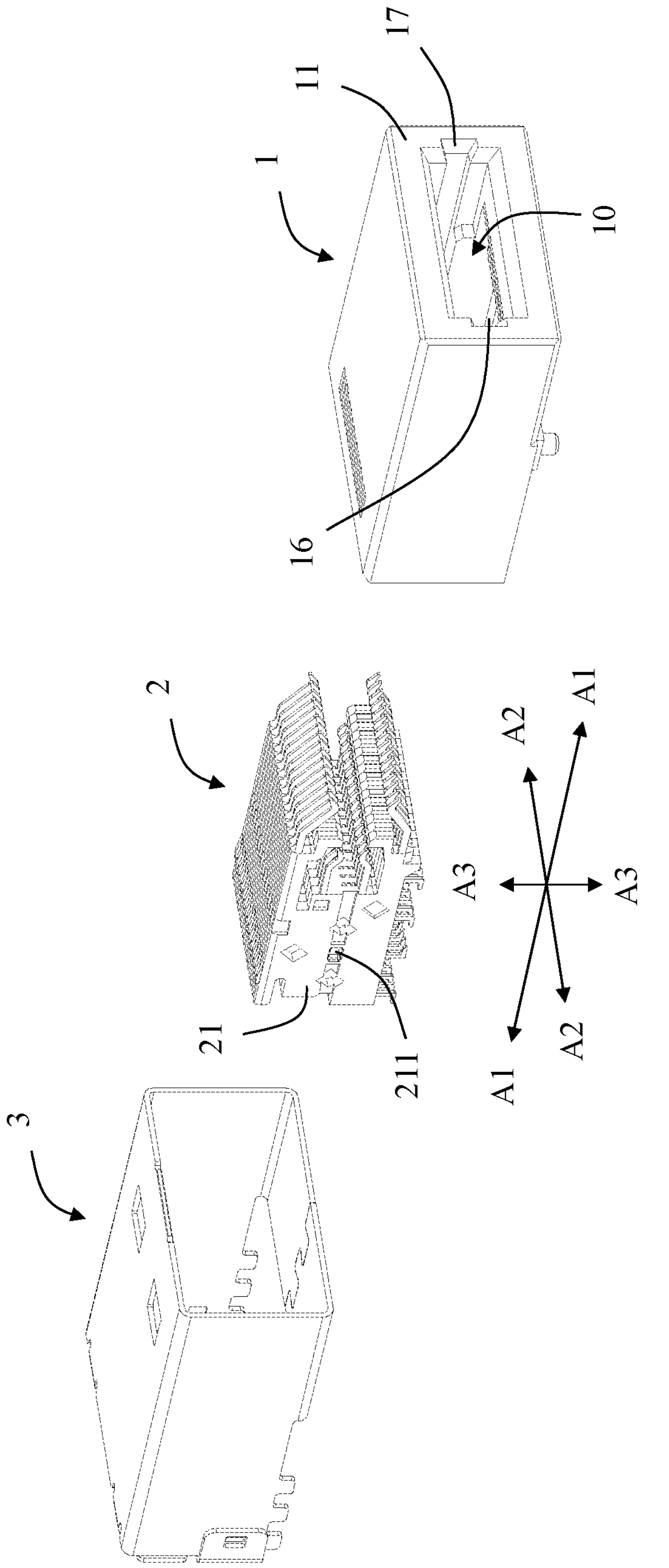
FIG. 8 is a partially exploded perspective view of FIG. 7 from another angle.

Referring to FIG. 6 to FIG. 8, the insulating body 1 includes a mating surface 11, an assembly surface 12 opposite to the mating surface 11, a mounting surface 13 at a bottom of the insulating body 1, a mating slot 10 extending forwardly through the mating surface 11 along a first direction A1-A1 (e.g., a front-rear direction), a positioning rib 14 located on one side (e.g., a left side) of the mating slot 10 along a second direction A2-A2 (e.g., a left-right direction), and a positioning groove 15 located on another side (e.g., a right side) of the mating slot 10 along the second direction A2-A2. The mounting surface 13 is used for being mounted on the circuit board 300. In addition, the insulating body 1 further includes a first notch 16 and a second notch 17. The first notch 16 and the second notch 17 extend through the mating surface 11 along the first direction A1-A1, and are located on opposite sides of the mating slot 10, respectively. Both the first notch 16 and the second notch 17 communicate with the mating slot 10. The first notch 16 and the second notch 17 are symmetrically disposed on the opposite sides (e.g., left and right sides) of the mating slot 10 along the second direction A2-A2. The mating slot 10, the first notch 16 and the second notch 17 are symmetrical as a whole. In this way, there is no need to distinguish whether the mating connector 200 is plugged in a forward direction or plugged in a reverse direction. That is, the mating connector 200 can be inserted into the electrical connector 100 regardless of whether the mating connector 200 is inserted forwardly or reversely, which greatly improves the convenience of use and improves the user experience. In the embodiment shown in the present disclosure, the second direction A2-A2 and the first direction A1-A1 are perpendicular to each other.

Referring to FIG. 10, specifically, in the embodiment shown in the present disclosure, the mating slot 10 includes a first slot 101 and a second slot 102 which is located at a rear end of the first slot 101 and communicated with the first slot 101. A height of the first slot 101 along a third direction A3-A3 (e.g., a top-bottom direction) is greater than a height of the second slot 102 along the third direction A3-A3. In other words, a distance between an upper edge and a lower edge of the first slot 101 along the third direction A3-A3 is greater than a distance between an upper edge and a lower edge of the second slot 102 along the third direction A3-A3. Referring to FIG. 8, the third direction A3-A3 is perpendicular to the first direction A1-A1 and the second direction A2-A2.

Referring to FIGS. 6 to 8 and FIGS. 11 to 13, the insulating body 1 includes a first wall 191, a second wall 192 opposite to the first wall 191, a first connecting wall 193 connecting one side of the first wall 191 and one side of the second wall 192, a second connecting wall 194 connecting another side of the first wall 191 and another side of the second wall 192, and an accommodating space 190 enclosed by the first wall 191, the second wall 192, the first connecting wall 193 and the second connecting wall 194. The plurality of terminal modules 2 are accommodated in the accommodating space 190. The first slot 101 is located between the first wall 191 and the second wall 192. The second wall 192 is provided with an installation opening 1921 communicating with the accommodating space 190.

Figure 9:
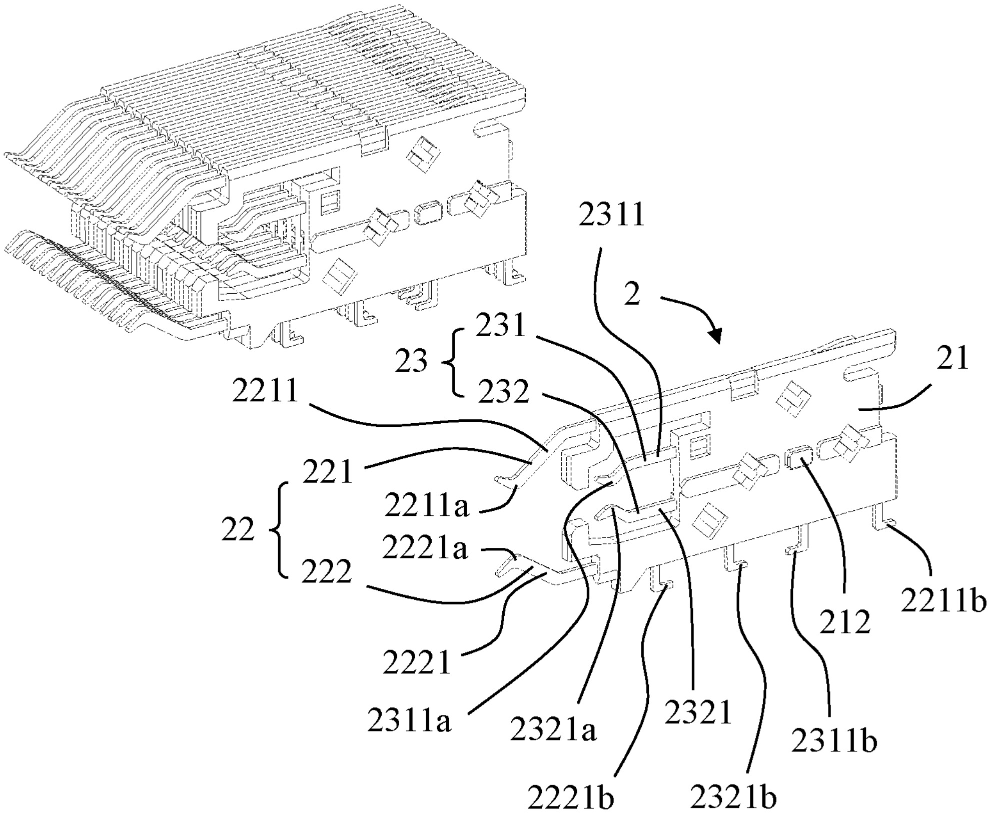
FIG. 9 is a perspective view of a plurality of terminal modules of the electrical connector of the present disclosure, wherein one terminal module is separated.

Referring to FIG. 7 to FIG. 9, the plurality of terminal modules 2 are arranged side by side along the second direction A2-A2 and assembled into a whole. After being assembled, the plurality of terminal modules 2 as a whole are assembled into the insulating body 1 from the assembly surface 12. Each terminal module 2 includes an insulating block 21 and a plurality of terminal groups fixed to the insulating block 21. In an embodiment of the present disclosure, the plurality of terminal groups are insert-molded with the insulating block 21. Of course, it is understandable to those skilled in the art that the plurality of terminal groups can also be fixed to the insulating block 21 by means of assembly or the like. In some embodiments, the insulating block 21 may not even be provided, and the terminal groups may be directly fixed to the insulating body 1.

In the illustrated embodiment of the present disclosure, each insulating block 21 includes an assembly groove 211 and an assembly rib 212. When the plurality of terminal modules 2 are assembled into a whole, in two adjacent terminal modules 2, the assembly groove 211 of the insulating block 21 of one of the two adjacent terminal modules 2 and the assembly rib 212 of the insulating block 21 of a remaining one of the two adjacent terminal modules 2 are in lock with each other. When all the terminal modules 2 are assembled as a whole, the assembly groove 211 of the insulating block 21 of the terminal modules 2 on a first outer side (e.g., a left side) is matched with the positioning rib 14 of the insulating body 1; and the assembly rib 212 of the insulating block 21 of the terminal modules 2 on a second outer side (e.g., a right side) are matched with the positioning groove 15 of the insulating body 1. Such arrangement is beneficial to accurately install the plurality of terminal modules 2 into the insulating body 1. The terminal module 2 located on the first outer side and the terminal module 2 located on the second outer side are two terminal modules located on outermost sides (for example, leftmost and rightmost sides) of the plurality of terminal modules 2, respectively.

Referring to FIG. 9, the plurality of terminal groups include a first terminal group 22 and a second terminal group 23. The first terminal group 22 includes a first conductive terminal 221 and a second conductive terminal 222. The second terminal group 23 includes a third conductive terminal 231 and a fourth conductive terminal 232. The first conductive terminal 221 includes a first elastic arm 2211. The first elastic arm 2211 includes a first mating portion 2211*a* that at least partially protrudes into the mating slot 10, and a first mounting portion 2211*b* that extends beyond the insulating block 21. The second conductive terminal 222 includes a second elastic arm 2221. The second elastic arm 2221 includes a second mating portion 2221*a* that at least partially protrudes into the mating slot 10, and a second mounting portion 2221*b* that extends beyond the insulating block 21. The third conductive terminal 231 includes a third elastic arm 2311. The third elastic arm 2311 includes a third mating portion 2311*a* that at least partially protrudes into the mating slot 10, and a third mounting portion 2311*b* that extends beyond the insulating block 21. The fourth conductive terminal 232 includes a fourth elastic arm 2321. The fourth elastic arm 2321 includes a fourth mating portion 2321*a* that at least partially protrudes into the mating slot 10, and a fourth mounting portion 2321*b* that extends beyond the insulating block 21. The first mating portion 2211*a* and the second mating portion 2221*a* are disposed facing each other. The third mating portion 2311*a* and the fourth mating portion 2321*a* are disposed facing each other. In the embodiment shown in the present disclosure, the first mounting portion 2211*b*, the second mounting portion 2221*b*, the third mounting portion 2311*b*, and the fourth mounting portion 2321*b* are used for being soldered or welded to the circuit board 300. In the embodiment shown in the present disclosure, the first mounting portion 2211*b*, the second mounting portion 2221*b* and the fourth mounting portion 2321*b* are bent in a same direction. The third mounting portion 2311*b* is bent in an opposite direction. This arrangement facilitates better impedance matching. The first mounting portion 2211*b*, the second mounting portion 2221*b*, the third mounting portion 2311*b* and the fourth mounting portion 2321*b* extend beyond the second wall 192 through the installation opening 1921 for being mounted to the circuit board 300.

Referring to FIG. 10, in the embodiment shown in the present disclosure, the first elastic arm 2211 and the second elastic arm 2221 are symmetrically disposed on the opposite sides (e.g., upper and lower sides) of the first slot 101 along the third direction A3-A3, respectively. The third elastic arm 2311 and the fourth elastic arm 2321 are symmetrically disposed on the opposite sides (e.g., upper and lower sides) of the second slot 102 along the third direction A3-A3, respectively. The first mating portion 2211*a* and the second mating portion 2221*a* are located on the opposite sides of the first slot 101 along the third direction A3-A3, respectively. The third mating portion 2311*a* and the fourth mating portion 2321*a* are located on the opposite sides of the second slot 102 along the third direction A3-A3, respectively.

The first mating portion 2211*a* and the third mating portion 2311*a* are located on a same side (e.g., an upper side) of the mating slot 10 in the third direction A3-A3. The first mating portion 2211*a* and the third mating portion 2311*a* are located at different heights in the third direction A3-A3. In the embodiment shown in the present disclosure, the first mating portion 2211*a* is located higher than the third mating portion 2311*a*.

The second mating portion 2221*a* and the fourth mating portion 2321*a* are located on a same side (e.g., a lower side) of the mating slot 10 in the third direction A3-A3. The second mating portion 2221*a* and the fourth mating portion 2321*a* are located at different heights in the third direction A3-A3. In the embodiment shown in the present disclosure, the second mating portion 2221*a* is located lower than the fourth mating portion 2321*a*. Referring to FIG. 10, in the embodiment shown in the present disclosure, a distance between the first mating portion 2211*a* and the second mating portion 2221*a* in the third direction A3-A3 is greater than a distance between the third mating portion 2311*a* and the fourth mating portion 2321*a* in the third direction A3-A3.

The insulating block 21 includes a first block 213 and a second block 214. The first block 213 is located between the first mating portion 2211*a* and the third mating portion 2311*a* in the first direction A1-A1. The second block 214 is located between the second mating portion 2221*a* and the fourth mating portion 2321*a* in the first direction A1-A1. The first block 213 is provided with a first guiding inclined surface 2131. The second block 214 is provided with a second guiding inclined surface 2141. The first guiding inclined surface 2131 and the second guiding inclined surface 2141 form a guide opening communicating with the second slot 102 to guide the insertion of the tongue plate 72.

The insulating block 21 is not provided with an opening for exposing the second conductive terminal 222 out of the insulating block 21. The insulating block 21 is provided with a plurality of first openings 21*a* for exposing the first conductive terminal 232 out of the insulating block 21. The insulating block 21 is provided with a plurality of second openings 21*b* for exposing the third conductive terminal 231 out of the insulating block 21. The insulating block 21 is provided with a third opening 21*c* for exposing the fourth conductive terminal 221 out of the insulating block 21. The number of the first openings 21*a* is greater than the number of the second openings 21*b*. The number of the second openings 21*b* is greater than the number of the third opening 21*c*. In the embodiment shown in the present disclosure, the number of the first openings 21*a* is three. The number of the second openings 21*b* is two. The number of the third opening 21*c* is one. By arranging the first openings 21*a*, the second openings 21*b* and the third opening 21*c*, the impedance of the conductive terminals can be adjusted, thereby improving the quality of signal transmission.

When the mating connector 200 is mated with the electrical connector 100, the average top-and-bottom force of the mating connector 200 and the variation of the stepwise insertion force can be maintained, and the phenomenon of high insertion force at an initial stage of insertion of the mating connector 200 can be reduced. After the mating connector 200 is mated with the electrical connector 100 in place, the tongue plate 72 is inserted into the mating slot 10. Specifically, the second plate portion 722 is inserted into the second slot 102, and the first plate portion 721 is inserted into the first slot 101. At this time, the first metal pads 7211 are in contact with the first mating portions 2211*a*, the second metal pads 7212 are in contact with the second mating portions 2221*a*, the third metal pads 7221 are in contact with the third mating portions 2311*a*, and the fourth metal pads 7222 are in contact with the fourth mating portions 2321*a*. By arranging front and rear rows of conductive terminals, the present disclosure increases the number of terminals, which is beneficial to improve the speed of data transmission.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body comprising a mating surface, a mating slot extending through the mating surface along a first direction, a first notch and a second notch, the first notch and the second notch extending through the mating surface along the first direction and being located on opposite sides of the mating slot, respectively; the first notch and the second notch communicating with the mating slot, the first notch and the second notch being symmetrically formed on the opposites sides of the mating slot along a second direction, the second direction being perpendicular to the first direction; and a plurality of terminal groups comprising a first terminal group and a second terminal group, the first terminal group comprising a first conductive terminal and a second conductive terminal, the first conductive terminal and the second conductive terminal being not in contact with each other; the second terminal group comprising a third conductive terminal and a fourth conductive terminal, the third conductive terminal and the fourth conductive terminal being not in contact with each other; the first conductive terminal comprising a first elastic arm, the first elastic arm comprising a first mating portion at least partially protruding into the mating slot; the second conductive terminal comprising a second elastic arm, the second elastic arm comprising a second mating portion at least partially protruding into the mating slot; the third conductive terminal comprising a third elastic arm, the third elastic arm comprising a third mating portion at least partially protruding into the mating slot; the fourth conductive terminal comprising a fourth elastic arm, the fourth elastic arm comprising a fourth mating portion at least partially protruding into the mating slot; the first mating portion and the second mating portion being disposed facing each other, the third mating portion and the fourth mating portion being disposed facing each other;

wherein the mating slot comprises a first slot and a second slot which is located at a rear end of the first slot and communicated with the first slot; the first mating portion and the second mating portion are located on opposite sides of the first slot along a third direction, respectively; the third mating portion and the fourth mating portion are located on opposite sides of the second slot along the third direction, respectively; the third direction is perpendicular to the first direction and the second direction;

wherein the first mating portion and the third mating portion are located on a same side of the mating slot in the third direction; and the first mating portion and the third mating portion are located at different heights in the third direction;

wherein the second mating portion and the fourth mating portion are located on a same side of the mating slot in the third direction; and the second mating portion and the fourth mating portion are located at different heights in the third direction;

wherein a distance between the first mating portion and the second mating portion in the third direction is greater than a distance between the third mating portion and the fourth mating portion in the third direction;

wherein the electrical connector is configured to mate with a mating connector; the mating connector comprises a tongue plate comprising a first plate portion and a second plate portion; the first plate portion and the second plate portion are arranged along the first direction; a thickness of the first plate portion is greater than a thickness of the second plate portion; the first plate portion comprises a first metal pad and a second metal pad that are provided on opposite surfaces thereof, respectively; the second plate portion comprises a third metal pad and a fourth metal pad that are provided on opposite surfaces thereof, respectively;

wherein the first plate portion is configured to be received in the first slot and the second plate portion is configured to be received in the second slot, so that the first metal pad is in contact with the first mating portion, the second metal pad is in contact with the second mating portion, the third metal pad is in contact with the third mating portion, and the fourth metal pad is in contact with the fourth mating portion.

2. The electrical connector according to claim 1, wherein the first elastic arm and the second elastic arm are symmetrically disposed on the opposite sides of the first slot along the third direction, respectively; and wherein the third elastic arm and the fourth elastic arm are symmetrically disposed on the opposite sides of the second slot along the third direction.

3. The electrical connector according to claim 1, further comprising a plurality of terminal modules which are arranged side by side along the second direction and assembled together; wherein each terminal module comprises an insulating block and the plurality of terminal groups fixed to the insulating block.

4. The electrical connector according to claim 3, wherein the insulating body comprises an assembly surface opposite the mating surface; and wherein after the plurality of terminal modules are assembled, the plurality of terminal modules as a whole are assembled into the insulating body from the assembly surface.

5. The electrical connector according to claim 3, wherein the insulating block comprises a first block and a second block, the first block is located between the first mating portion and the third mating portion in the first direction, the second block is located between the second mating portion and the fourth mating portion in the first direction, the first block is provided with a first guiding inclined surface, the second block is provided with a second guiding inclined surface, and the first guiding inclined surface and the second guiding inclined surface form a guide opening communicated with the second slot.

6. The electrical connector according to claim 3, wherein the insulating body comprises a first wall, a second wall opposite the first wall, a first connecting wall connecting one side of the first wall and one side of the second wall, a second connecting wall connecting another side of the first wall and another side of the second wall, and an accommodating space enclosed by the first wall, the second wall, the first connecting wall and the second connecting wall; and wherein the plurality of terminal modules are accommodated in the accommodating space, and the first slot is located between the first wall and the second wall.

7. The electrical connector according to claim 6, wherein the first conductive terminal comprises a first mounting portion, the second conductive terminal comprises a second mounting portion, the third conductive terminal comprises a third mounting portion, the fourth conductive terminal comprises a fourth mounting portion, the second wall is provided with an installation opening communicating with the accommodating space, and the first mounting portion, the second mounting portion, the third mounting portion and the fourth mounting portion extend beyond the second wall through the installation opening.

8. The electrical connector according to claim 1, wherein the insulating body comprises a positioning rib located on one side of the mating slot in the second direction, and a positioning groove located on an opposite side of the mating slot in the second direction; and wherein the electrical connector comprises a plurality of terminal modules which are arranged side by side along the second direction and assembled as a whole, each terminal module comprises an insulating block and the plurality of terminal groups fixed to the insulating block, the insulating block of the terminal modules located on a first outer side is provided with an assembly groove matched with the positioning rib, the insulating block of the terminal modules located on a second outer side is provided with an assembly rib matched with the positioning groove, the terminal module located on the first outer side and the terminal module located on the second outer side are two terminal modules located on outermost sides of the plurality of terminal modules, respectively.

9. The electrical connector according to claim 8, wherein the insulating block of each terminal module is provided with a rib located on one side of the insulating block and a groove located on another side of the insulating block; and wherein in two adjacent terminal modules, the rib of the insulating block of one of the two adjacent terminal modules is in lock with the groove of the insulating block of a remaining one of the two adjacent terminal modules.

10. The electrical connector according to claim 1, wherein the first plate portion and the second plate portion jointly form stepped-shaped configurations on two sides of the tongue plate in the third direction.

11. An electrical connector, comprising:

an insulating body comprising a mating surface, a mating slot extending through the mating surface along a first direction, a first notch and a second notch, the first notch and the second notch extending through the mating surface along the first direction and being located on opposite sides of the mating slot, respectively; the first notch and the second notch communicating with the mating slot, the first notch and the second notch being symmetrically formed on the opposites sides of the mating slot along a second direction, the second direction being perpendicular to the first direction; and a plurality of terminal groups comprising a first terminal group and a second terminal group, the first terminal group comprising a first conductive terminal and a second conductive terminal, the second terminal group comprising a third conductive terminal and a fourth conductive terminal, the first conductive terminal comprising a first elastic arm, the first elastic arm comprising a first mating portion at least partially protruding into the mating slot; the second conductive terminal comprising a second elastic arm, the second elastic arm comprising a second mating portion at least partially protruding into the mating slot; the third conductive terminal comprising a third elastic arm, the third elastic arm comprising a third mating portion at least partially protruding into the mating slot; the fourth conductive terminal comprising a fourth elastic arm, the fourth elastic arm comprising a fourth mating portion at least partially protruding into the mating slot; the first mating portion and the second mating portion being disposed facing each other, the third mating portion and the fourth mating portion being disposed facing each other;

wherein the mating slot comprises a first slot and a second slot which is located at a rear end of the first slot and communicated with the first slot; the first mating portion and the second mating portion are located on opposite sides of the first slot along a third direction, respectively; the third mating portion and the fourth mating portion are located on opposite sides of the second slot along the third direction, respectively; the third direction is perpendicular to the first direction and the second direction;

wherein the electrical connector further comprises a plurality of terminal modules which are arranged side by side along the second direction and assembled together; each terminal module comprises an insulating block and the plurality of terminal groups fixed to the insulating block; and wherein the insulating block is not provided with an opening exposing the second conductive terminal out of the insulating block; the insulating block is provided with a first opening exposing the fourth conductive terminal out of the insulating block; the insulating block is provided with a plurality of second openings exposing the third conductive terminal out of the insulating block; the insulating block is provided with a plurality of third openings exposing the first conductive terminal out of the insulating block; the number of the third openings is greater than the number of the second openings, and the number of the second openings is greater than the number of the first opening.

12. A connector assembly, comprising:

an electrical connector comprising:

an insulating body comprising a mating surface, a mating slot extending through the mating surface along a first direction, a first notch and a second notch, the first notch and the second notch extending through the mating surface along the first direction and being located on opposite sides of the mating slot, respectively; the first notch and the second notch communicating with the mating slot, the first notch and the second notch being symmetrically formed on the opposites sides of the mating slot along a second direction, the second direction being perpendicular to the first direction; and a plurality of terminal groups comprising a first terminal group and a second terminal group, the first terminal group comprising a first conductive terminal and a second conductive terminal, the first conductive terminal and the second conductive terminal being not in contact with each other; the second terminal group comprising a third conductive terminal and a fourth conductive terminal, the third conductive terminal and the fourth conductive terminal being not in contact with each other; the first conductive terminal comprising a first elastic arm, the first elastic arm comprising a first mating portion at least partially protruding into the mating slot; the second conductive terminal comprising a second elastic arm, the second elastic arm comprising a second mating portion at least partially protruding into the mating slot; the third conductive terminal comprising a third elastic arm, the third elastic arm comprising a third mating portion at least partially protruding into the mating slot; the fourth conductive terminal comprising a fourth elastic arm, the fourth elastic arm comprising a fourth mating portion at least partially protruding into the mating slot; the first mating portion and the second mating portion being disposed facing each other, the third mating portion and the fourth mating portion being disposed facing each other; and a mating connector comprising:

a tongue plate comprising a first plate portion and a second plate portion, the first plate portion and the second plate portion being arranged along the first direction, a thickness of the first plate portion being greater than a thickness of the second plate portion, a first metal pad and a second metal pad being provided on opposite surfaces of the first plate portion, respectively; a third metal pad and a fourth metal pad being provided on opposite surfaces of the second plate portion, respectively;

when the mating connector is mated with the electrical connector, the tongue plate is inserted into the mating slot, the first metal pad is in contact with the first mating portion, the second metal pad is in contact with the second mating portion, the third metal pad is in contact with the third mating portion, and the fourth metal pad is in contact with the fourth mating portion.

13. The connector assembly according to claim 12, wherein the mating slot comprises a first slot and a second slot which is located at a rear end of the first slot and communicated with the first slot; the first mating portion and the second mating portion are located on opposite sides of the first slot along a third direction, respectively; the third mating portion and the fourth mating portion are located on opposite sides of the second slot along the third direction, respectively; the third direction is perpendicular to the first direction and the second direction.

14. The connector assembly according to claim 13, wherein the first mating portion and the third mating portion are located on a same side of the mating slot in the third direction; and the first mating portion and the third mating portion are located at different heights in the third direction; and wherein the second mating portion and the fourth mating portion are located on a same side of the mating slot in the third direction; and the second mating portion and the fourth mating portion are located at different heights in the third direction.

15. The connector assembly according to claim 14, wherein a distance between the first mating portion and the second mating portion in the third direction is greater than a distance between the third mating portion and the fourth mating portion in the third direction.

16. The connector assembly according to claim 12, wherein the insulating body comprises a positioning rib located on one side of the mating slot in the second direction, and a positioning groove located on an opposite side of the mating slot in the second direction; and wherein the connector assembly comprises a plurality of terminal modules which are arranged side by side along the second direction and assembled as a whole, each terminal module comprises an insulating block and the plurality of terminal groups fixed to the insulating block, the insulating block of the terminal modules located on a first outer side is provided with an assembly groove matched with the positioning rib, the insulating block of the terminal modules located on a second outer side is provided with an assembly rib matched with the positioning groove, the terminal module located on the first outer side and the terminal module located on the second outer side are two terminal modules located on outermost sides of the plurality of terminal modules, respectively.

17. The connector assembly according to claim 16, wherein the insulating block of each terminal module is provided with a rib located on one side of the insulating block and a groove located on another side of the insulating block; and wherein in two adjacent terminal modules, the rib of the insulating block of one of the two adjacent terminal modules is in lock with the groove of the insulating block of a remaining one of the two adjacent terminal modules.

18. The connector assembly according to claim 12, wherein the electrical connector comprises a plurality of terminal modules which are arranged side by side along the second direction and assembled together; wherein each terminal module comprises an insulating block and the plurality of terminal groups fixed to the insulating block; the insulating body comprises a first wall, a second wall opposite the first wall, a first connecting wall connecting one side of the first wall and one side of the second wall, a second connecting wall connecting another side of the first wall and another side of the second wall, and an accommodating space enclosed by the first wall, the second wall, the first connecting wall and the second connecting wall; and wherein the plurality of terminal modules are accommodated in the accommodating space, and the first slot is located between the first wall and the second wall.

19. The connector assembly according to claim 12, wherein the first plate portion and the second plate portion jointly form stepped-shaped configurations on two sides of the tongue plate.

20. The connector assembly according to claim 12, wherein the tongue plate is formed by a plurality of built-in circuit boards.

* * * * *